United States Patent Office 3,812,006 Patented May 21, 1974

3,812,006

REPLACEMENT FOR LEATHER AND METHOD FOR MAKING SAME

Walter E. Schortmann, West Hartford, Conn., Michael A. Derose, Springfield, Mass., and Donald A. Ward, Wheaton, Ill., assignors to Texon, Inc., South Hadley Falls, Mass.

No Drawing. Continuation-in-part of abandoned application Ser. No. 843,238, July 18, 1969. This application Dec. 14, 1971, Ser. No. 207,969
Int. Cl. D21d 3/00
U.S. Cl. 162—146 8 Claims

ABSTRACT OF THE DISCLOSURE

A replacement for leather which is a homogeneous sheet formed by the combination of fibrous material, a water base polyurethane latex binder and a hydrogen bonder. The leather replacement is produced by treating a fibrous web with a water base polyurethane latex and with a solution containing a hydrogen bonder.

This application is a continuation-in-part of Application Ser. No. 843,238, filed July 18, 1969, now abandoned.

This invention relates to a product which will function as a replacement for leather. It also relates to a process for producing the product.

In general, the product of this invention may be described as a homogeneous sheet material formed by the combination of fibrous material, a water base polyurethane latex, and a hydrogen bonder.

As is known, many attempts have been made in the past to produce a replacement for leather. While in some instances these products have been called "synthetic" leathers, they are for the most part layered products of woven or knitted fabrics having a synthetic plastic coating thereon. Such products have the inherent disadvantage in that once the outer layer is damaged by heat, abrasion, chemicals, etc., the product becomes esthetically unacceptable. Furthermore, many existing multilayered composite materials suffer from not being sufficiently porous to readily allow air or water to pass through them.

It is an object of the present invention to provide a replacement for leather possessing many of the physical characteristics of good quality leather.

It is also an object of the present invention to provide a method for producing the leather replacement of the instant invention.

It is a further object of the invention to produce a leather substitute which may be finished so as to have the appearance of leather.

The above and other objects and advantages of the present invention will be apparent from the following detailed description of the invention.

As mentioned above, the product of the present invention is a homogeneous material formed by the combination of a fibrous material, a water base polyurethane latex, and a hydrogen bonder. The fibers which are used with the polyurethane latex are primarily cellulosic fibers, such as jute, hemp, mercerized Kraft and the ordinary paper making fibers. While synthetic fibers, such as acrylic, polyester and polyamide, are also contemplated, they do not appear to impart any added strength characteristics to the end product. It is postulated that the reason for this stems from the fact that the polyurethane latex does not form as many bonds with the synthetic fibers as it does with the cellulose fibers.

Length and diameter of the various fibers used do not appear to present any degree of criticality. For example, while jute fibers have an average diameter of approximately .02 mm. and an average length of about 4.8 mm., it would appear that fibers having an average diameter of from .01 mm. to .06 mm. and an average length of from 2.0 mm. to 6.0 mm. are acceptable.

Referring to the polyurethane resins employed in the latex form in the present invention they may generally be described as organic block type anionic polymers wherein the organic blocks are either interrupted by short segments carrying salt-type groups or terminated by segments carrying salt-type groups. Such polyurethane resins do not contain any free isocyanate groups capable of reacting with subsequently added hydrogen containing compounds so as to extend and chain link or cure them. In general, these resins have a predominantly hydrophobic character, but owing to the presence of the anionic salt-type groups they have hydrophilic centers which enable aqueous colloidal solutions or aqueous dispersions to be prepared from them.

The polyurethane latices may be prepared by reacting together a (1) predominantly linear compound having active hydrogen atoms, at least one hydroxyl group and a molecular weight of from 300 to 20,000, (2) a polyisocyanate and if desired, chain lengthening agents having reactive hydrogen atoms, and (3) a compound having at least one hydrogen atom reactive with isocyanate groups and at least one anionic salt-type group or group capable of anionic salt formation. In such materials the ratio of isocyanate groups to hydrogen atoms reactive with isocyanate groups in the compounds capable of salt formation, is such that the groups capable of salt formation present do not undergo reaction with the isocyanate groups, and the resulting polyurethane is subsequently converted in part to the salt form by reaction with an organic or inorganic base in the case where groups capable of salt formation are present. The proportion by weight of the salt-type groups contained in the polyurethane is more than 0.1% and not more than 5%, preferably between 0.4 and 2.0%, and, when the salt-type groups are carboxyl groups, then not more than 3%.

Of the first type of compounds listed, the polyhydroxy compound, such as polyesters, polyacetals, polyethers and polyester amides are preferred.

As for the polyisocyanates, such compounds include any aromatic and aliphatic diisocyanates such as 1:5-naphthylene diisocyanate, 4,4'-diphenyldimethylmethane diisocyanate, di- and tetralkyldiphenylmethane-4,4'-diisocyanates, 4,4'-dibenzyl diisocyanate, 1:3-phenylene-diisocyanate, the isomers of toluylene diisocyanate, if desired in admixture, butane-1:4-diisocyanate, hexane-1:6-diisocyanate, dicyclohexylmethane-4,4'-diisocyanate, cyclohexane-1:4-diisocyanate, etc. In general, the aliphatic diisocyanates are preferred.

Compounds which contain at least one hydrogen atom reactive with isocyanate group and at least one salt-type group or group capable of salt formation which may be used, if desired in admixture, include the following, e.g.: hydroxy-acids; aliphatic, cycloaliphatic, aromatic and heterocyclic mono- and diaminocarboxylic acids; hydroxy-sulphonic acids; aminosulphonic acids; and the hydroxy and amino-carboxylic and -sulphonic acids.

In this type of compound mentioned above, the expression "salt-type group" is used to denote the following groups:

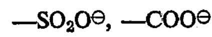

$$—SO_2O^{\ominus},\ —COO^{\ominus}$$

To achieve a sufficient amount of salt-type groups in the polyurethanes that are produced, the proportion by weight of the salt-type group incorporated should be more than 0.1% and not more than 5%, and in the case of the carboxylate group not more than 3%.

The following two examples are given to show typical preparation of the carboxylate and sulphonate polyurethane latices:

EXAMPLE I 212.5 g. of an adipic acid-1,6-hexane diol-neopentylglycolpolyester (OH number 66.0) were reacted at 120° C. with 51 g. of 1,6-hexane diisocyanate. The adduct was dissolved at 55° in 800 ml. of acetone. An aqueous solution of 18.25 g. of lysine and 70 ml. of 10 percent potassium hydroxide solution in 50 ml. of water were added to the solution of the adduct. When the reaction was complete, 450 ml. of water were added and acetone was distilled off. A stable dispersion was obtained with an pH-value of 8 and a solid content of 41 percent. The dispersion after drying yielded clear, elastic, high tensile strength foils.

EXAMPLE II 205 g. of an 1,6-hexanediol-phthalic acid-polyester (OH-number 60.0) were reacted at 120° C. for two hours with 35.5 g. of 1,6-hexane diisocyanate. The adduct was dissolved in 800 ml. of acetone. A mixture of 3.76 g. of ethylene diamine, 7.65 g. of 1,3-propane sultone and 35 ml. of 10 percent aqueous potassium hydroxide solution in 50 ml. of water was added. After addition of 340 ml. of water the acetone was distilled off. A 42 percent dispersion was obtained.

The process for making the products of the present invention may generally be described as the double saturation of the fibers employed in a fibrous web. Specifically, the preferred embodiment of the method involves the formation of a fibrous web that is first saturated with a water base polyurethane latex, followed by a second saturation of the web with a hydrogen bonder solution.

The following examples are given in order to more fully illustrate the method of the invention and exemplify the products produced thereby. All percentages are weight percent unless otherwise indicated.

EXAMPLE III

This example is given to show a procedure for preparing the products of the present invention.

500 g. of a bone dry fiber and 23,000 cc. of tap water were placed in a beater so as to form a slurry having a consistency of approximately 2.1%. Approximately 695 cc. of the slurry was removed from the beater and poured into a deckle box so as to form a fiber sheet. After forming and pressing the fiber sheet, the wet composition of the sheet was calculated as approximately 45.5% fiber and 54.5% water.

The wet fibrous sheet was then placed on the surface of an aqueous saturant solution, i.e., a polyurethane latex having 20% solids, and allowed to completely soak through from the bottom of the fiber sheet. The saturated sheet was then pressed to remove excess water and dried in a dryer at 250° F. for 40 minutes with turning of the sheet every 5 minutes. At this point the pressed and dried sheet was calculated to have a polyurethane latex binder content of approximately 31.7%.

Next, the dried and pressed sheet was saturated again with a second solution comprising 10% hydrogen bonder, 1% Triton X–100 which is a nonionic alkyl aryl polyether alcohol surfactant having 9–10 polyoxyethylene chain links and which is produced by Rohm & Haas Company, and 89% water. This saturant solution was allowed to completely soak through the sheet from the bottom thereof.

After further pressing and drying, the bone dry weight analysis of the sheet was 55.6% fiber, 31.7% polyurethane latex binder and 12.7% hydrogen bonder.

EXAMPLE IV

This example is presented to show the comparison of typical calf skin leather and a hand sheet made by the procedure of Example III wherein hemp pulp was employed as the fiber and urea as the hydrogen bonder:

| | Leather | Fiber hand sheet |
|---|---|---|
| Tensile, lb./1" strip | *130 x 170 | 158.0 |
| Stretch, percent | 50 x 47 | 13.7 |
| Edge tear, lb./1" strip | 312 x 282 | 219.0 |
| Stiffness, Taber units | 22 x 34 | 165.0 |

*The first value in the sequence of numbers represents a longitudinal direction value and the second represents a cross direction value.

As is readily noted from the above, the saturated fiber hand sheet comes quite close to leather in the physical properties listed.

EXAMPLE V

This example is presented to demonstrate the effect the second saturation has on the physical properties of the end product. In this example, a hand sheet was made following the procedure of Example III, except that the second or post-saturation of the sheet with the hydrogen bonder was not employed. As in Example IV hemp pulp constituted the fibrous material. The physical properties of the end product are as follows:

| | |
|---|---|
| Tensile—lbs./1" strip | 164.0 |
| Stretch—percent | 9.1 |
| Edge tear—lbs./1" strip | 53.0 |
| Stiffness—Taber units | 280.0 |

As is clear from the above results, the omission of the post-saturation step produces an end product with less than desirable physical characteristics as compared to leather. In particular, it exhibits great stiffness and poor edge tear.

EXAMPLE VI

This example is presented to demonstrate the effect the various steps of the method have on the edge tear of the end product. A variety of samples were prepared using hemp pulp for the fibrous material. As indicated in the following table in some instances the initial saturation step was omitted, and in other instances the post-saturant was omitted. As a norm, the edge tear for an untreated fiber hand sheet is given as Sample 1:

| Sample number | Saturant | Post saturant | Edge tear, lb./1" strip |
|---|---|---|---|
| 1 | None | None | 61 |
| 2 | do | 17.7% urea | 34 |
| 3 | 32.0% polyurethane latex | None | 48 |
| 4 | 31.3% polyurethane latex | 13.8% urea | 235 |
| 5 | 34.0% polyurethane latex | None | 66 |
| 6 | 34.1% polyurethane latex | 11.5% urea | 207 |

The above listed results readily point up the synergistic effect that the double saturation has on the fibrous sheets. This effect is even more significant than one might expect in that the results show that one saturation without the other in some cases actually produces a physically weaker product than where no saturation is employed.

EXAMPLE VII

In this experiment, a hand sheet was prepared according to the procedure of Example III. However, another hemp pulp was selected as the fibrous material and the amount of hydrogen bonder, i.e., urea, in the final product was determined to be 16.2%. The edge tear of this sample was found to be 209 lbs./1" strip.

While the post-saturant hydrogen bonder has been exemplified in the above examples as urea, other hydrogen bonders, such as the substituted ureas, such as phenyl urea, propyl urea, tetramethyl urea, the methylol ureas, etc., are also contemplated.

The percent by weight composition of the leather replacement end product of this invention may be varied depending on the intended use. For example, the fiber content may vary from about 35% to 85%, which may include up to 10% synthetic fiber mixed with cellulosic fiber, the polyurethane binder from about 10% to 45%, and the hydrogen bonder from about 2% to 25%. For most applications, however, it has been found that the preferred ranges are 45% to 65% fiber, 25% to 35% polyurethane latex binder, and 10% to 20% hydrogen bonder.

Additionally, additives for either joining fibers together, preventing excess bonding so as to impart softness, or promoting hydrogen bonding so as to increase the physical properties such as edge tear may be included in the process. Such additives include for example, fiber softeners, lubricants, coagulants and moistening agents.

As the products of the present invention are meant to function as a replacement for leather, it follows that they have as many end uses as leather. For example, the softer materials may be used for handbags, belts and the like, while the stiffer materials may be used in luggage, book binding, inner soles for shoes, etc.

Having thus described the invention, what is claimed is:

1. A process for the manufacture of a leather like product which comprises forming a sheet from an aqueous slurry containing from 35% to 85% by weight of said product of fibers, said fibers being selected from the group consisting of cellulose fibers and a mixture of cellulose fibers and up to 10% synthetic fibers, saturating said sheet with a water base polyurethane having anionic salt-type groups and no free reactive isocyanate groups, said polyurethane being present in an amount of from about 10% to 45% by weight of said product and then saturating said sheet with an aqueous solution of a urea, said urea comprising 2% to 25% by weight of said product.

2. The process of claim 1 wherein said fibers are cellulose fibers.

3. The process of claim 1 wherein said fibers are a mixture of cellulose and synthetic fibers, said synthetic fibers being present in an amount up to 10% by weight of said product.

4. A process for the manufacture of a leather replacement product which comprises forming a sheet from an aqueous slurry containing 40% to 65% by weight based on said product of cellulose fibers, saturating said sheet with a water base polyurethane latex having anionic salt-type groups and no free reactive isocyanate groups, said latex being present in an amount of from about 25% to 35% by weight of said product, and then saturating said sheet with an aqueous solution of urea in an amount of from 10% to 20% by weight of said product.

5. A homogeneous sheet material comprising a fiberous web first saturated with a water base polyurethane latex having anionic salt-type groups and no free reactive isocyanate groups, and then with an aqueous solution of a urea, said fibers forming said web being selected from the group consisting of cellulose fibers and a mixture of cellulose fibers and up to 10% synthetic fibers, and being present in an amount of from 35% to 85% by weight of said sheet, said latex being present in an amount of from 10% to 45% by weight of said sheet and said urea being present in an amount of from 2% to 25% by weight of said sheet.

6. The homogeneous sheet material of claim 5 wherein said fibers comprise 40% to 65% by weight of said sheet, said polyurethane latex comprises 25% to 35% by weight of said sheet, and said urea comprises 10% to 20% by weight of said sheet.

7. The homogeneous sheet material of claim 6 wherein said fibers are cellulose fibers.

8. The homogeneous sheet material of claim 6 wherein said fibers are a mixture of cellulose and synthetic fibers, said synthetic fibers being present in an amount up to 10% by weight of said sheet.

References Cited

UNITED STATES PATENTS 3,491,067 1/1970 Sellet ............ 162—164 X
3,595,732 7/1971 Tingerthal ....... 117—62.2 X ROBERT L. LINDSAY, Jr., Primary Examiner U.S. Cl. X.R.

8—116.2; 117—62.2, 76 P, 155 UA; 162—158, 169